United States Patent

Powierski et al.

[11] Patent Number: 6,088,411
[45] Date of Patent: Jul. 11, 2000

[54] METHOD AND APPARATUS FOR A UNIQUE WORD DIFFERENTIAL DETECTION AND DEMODULATION USING THE UNIQUE WORD DIFFERENTIAL DETECTION

[75] Inventors: Darren Powierski; Motoya Iwasaki, both of Tokyo, Japan

[73] Assignee: NEC Corporation, Tokyo, Japan

[21] Appl. No.: 08/980,290

[22] Filed: Nov. 28, 1997

[30] Foreign Application Priority Data

Nov. 27, 1996 [JP] Japan .................................. 8-316656

[51] Int. Cl.[7] .......................................................... H04L 7/06
[52] U.S. Cl. .............................................. 375/364; 370/514
[58] Field of Search ..................................... 375/210, 364, 375/371, 343, 365, 368, 369, 370; 370/503, 514

[56] References Cited

U.S. PATENT DOCUMENTS

| | | | |
|---|---|---|---|
| 4,530,103 | 7/1985 | Mosley, Jr. et al. | 375/208 |
| 5,276,710 | 1/1994 | Iwasaki | 375/94 |
| 5,809,009 | 9/1998 | Matsuoka et al. | 370/206 |
| 5,898,665 | 4/1999 | Sawahashi et al. | 370/342 |
| 5,901,180 | 5/1999 | Aslanis et al. | 375/261 |
| 5,901,183 | 5/1999 | Garin et al. | 375/343 |
| 5,917,864 | 6/1999 | Asahara | 375/344 |
| 5,953,367 | 9/1999 | Zhodzicshsky et al. | 375/206 |

FOREIGN PATENT DOCUMENTS

5-167630  7/1993  Japan .

*Primary Examiner*—Don N. Vo
*Assistant Examiner*—Phuong Phu
*Attorney, Agent, or Firm*—Young & Thompson

[57] ABSTRACT

A unique word (UW) differential detection system to provide a system that can expand a measurement range for the carrier frequency offset of the quasi-synchronized detection signal while maintaining detection of unique word position at a high accuracy, and maintaining a resolution for the carrier frequency at a low level. In an initial acquisition mode, the detection system uses a first UW differential detection circuit with a symbol delay N ($0.5 < N \leq 1$) and a second differential detection circuit with a symbol delay N/2 to generate a first UW detection signal of a first quasi-synchronized detection signal and first frequency offset information. The first frequency offset information reduces frequency offset of a second quasi-synchronized detection signal for demodulating a data signal. Then, the mode turns to a fine tune acquisition mode, where a third UW differential detection circuit with a symbol delay M ($1 < M$) operates to generate a second UW detection signal and a second UW detection signal as a verification check when the system detects a UW from a third quasi-synchronized detection signal.

15 Claims, 8 Drawing Sheets

FIG.1

Fs : SYMBOL REPETITION FREQUENCY (SYMBOL/ SECOND)
Tf : FRAME INTERVAL (SECOND)

METHOD AND APPARATUS FOR A UNIQUE WORD DIFFERENTIAL DETECTION AND DEMODULATION USING THE UNIQUE WORD DIFFERENTIAL DETECTION

BACKGROUND OF THE INVENTION

The present invention relates to a unique word differential detection method and a demodulator using the unique word differential detection which detect a known unique word (UW) and a carrier frequency offset of a quasi-synchronized detection signal by using a differential detection technique of the quasi-synchronized detection signal which quasi-synchronously detects an orthogonal modulation signal in which the known unique word is inserted in a data signal.

Such a unique word differential detection system has a feature that, when the orthogonal modulation signal is quasi-synchronously detected by using a local oscillator signal independent from the orthogonal modulation signal, the unique word can be detected even if there is a frequency difference between the carrier of the orthogonal modulation signal and the local oscillator signal, that is, even if there is a carrier frequency offset. In addition, it also has a feature that the unique word can be detected at a high speed. A unique word detector disclosed in Japanese Patent Application Laid-Open No. 5-167630 is one of such unique word differential detection systems. Now, a conventional unique word differential detection system is described with reference to FIGS. 1, 2 and 3.

Figure 1:
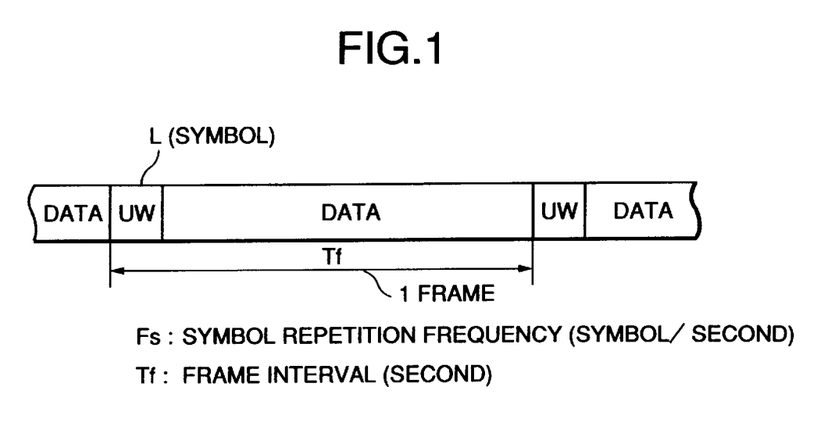
FIG. 1 is a data format of data signal containing a unique word and data.
Figure 2:
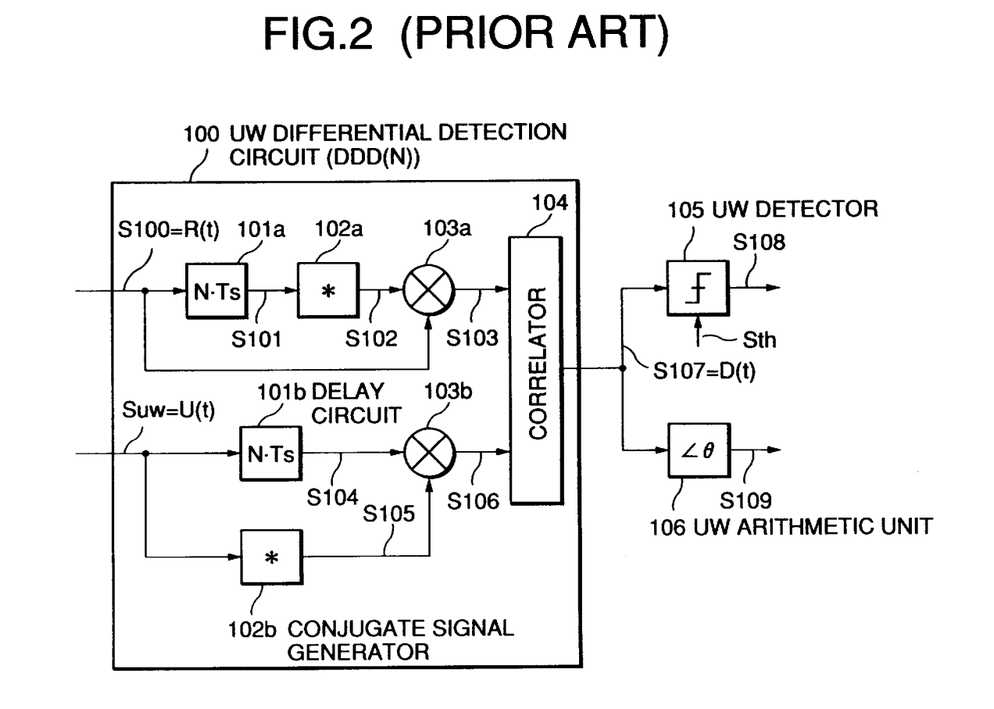
FIG. 2 is a block diagram showing a conventional unique word differential detection system.
Figure 3:
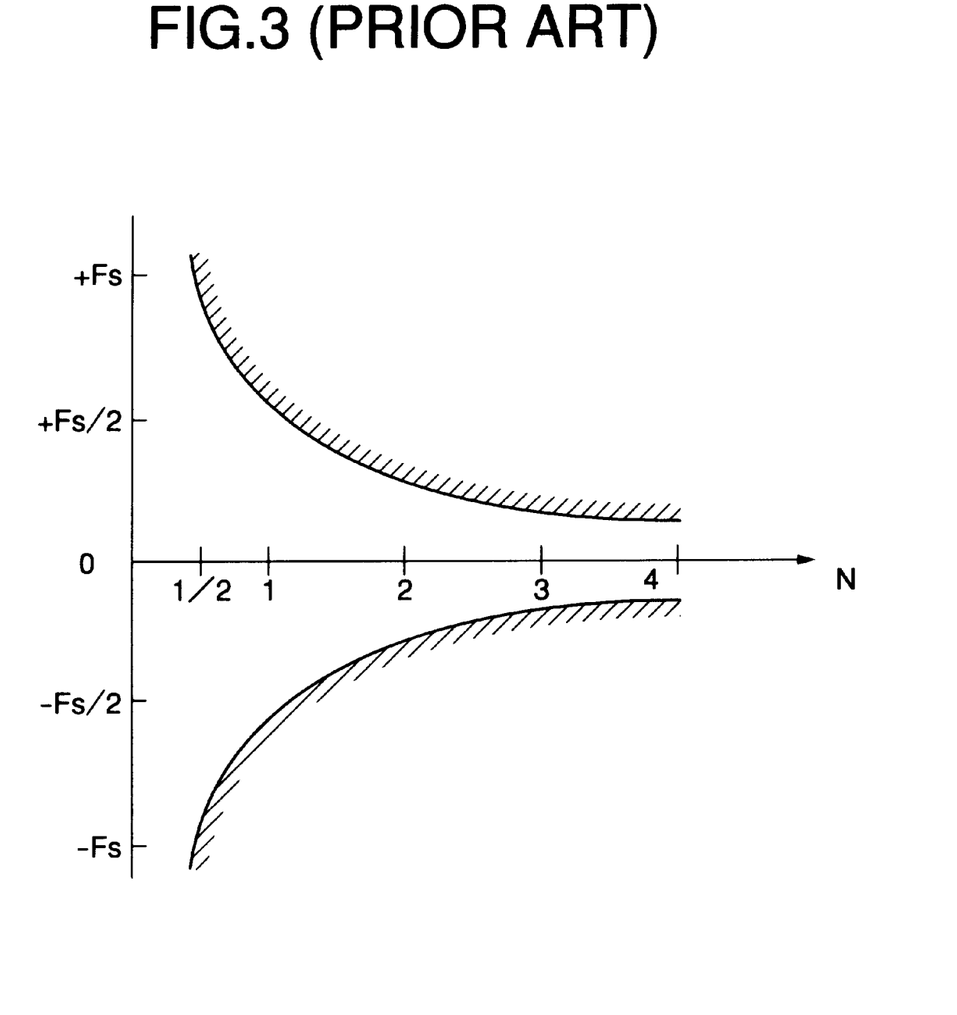
FIG. 3 is a relationship between amount of delay, N symbols, in the conventional unique word differential detection system and a measurement range for frequency offset $F_0$.

FIG. 1 is a format of data signal according to the present invention. FIG. 2 is a functional block diagram showing a unique word differential detection system according to the related art. The unique word differential detection circuit shown in the figure is a basic circuit for the unique word differential detection system according to the present invention. In addition, FIG. 3 is a diagram for illustrating the operation of the unique word differential detection system of FIG. 2.

Referring to FIG. 1, a base-band data signal according to the present invention constitutes one frame with a unique word (hereinafter sometimes abbreviated to UW) having a known L symbol train and data of a plurality of symbols. The UW is used for a frame signal. The data signal typically has a UW of 30–50 symbols, data of 200–400 symbols, and one frame interval Tf of 40–200 milliseconds (mS). The UW is positioned at the top of each frame. A symbol repetition frequency is represented by Fs (symbol/S), and one symbol interval is represented by Ts=1/Fs (S).

Referring to FIG. 2, a UW differential detector circuit 100 is supplied with a received quasi-synchronized detection signal S100=R (t) and a local unique word Suw=U (t) obtained by generating a known UW. Then, it outputs a mutually correlated signal S107=D (t) which is a signal which differentially detects the signal S100 mutually correlated with a signal which differentially detects the unique word Suw. The quasi-synchronized detection signal S100 is a signal which quasi-synchronously detects the orthogonal modulation signal with the known UW inserted in the data signal. The quasi-synchronized detection means synchronously detects the orthogonal modulation signal with a local oscillation signal independent from the orthogonal modulation signal but with a frequency close to that of the orthogonal modulation signal, and demodulates the orthogonal modulation signal into the data signal at base band. Generally, there is a frequency difference $F_O$ (Hz/S) or a carrier frequency offset (hereinafter called the "frequency offset") $F_O$ between the carrier of the orthogonal modulation signal and the local oscillation signal.

The quasi-synchronized detection signal S100 consists of two trains of in-phase (I) signals and quadrature (Q) signals. In the following, by considering that the quasi-synchronized detection signal S100 is a complex signal of I and Q signals, the in-phase component of a signal R (t) may be referred to as ReR (t) meaning a real signal component, and the quadrature signal component may be referred to as ImR (t) meaning an imaginary signal component. The signal R (t) is a signal with an inverted code "1" or "−1". ReR (t) and ImR (t) of the quasi-synchronized detection signal S100 are inserted with the same UW in the same timing, respectively. The quasi-synchronized detection signal R (t) is expressed by Formula (1) if there is the frequency offset F0.

$$R(t) = S(t) \cdot e^{j2\pi(F_0 \cdot t + \theta a)} \quad (1)$$

where S (t) is data to be transmitted, and assumed to be QPSK modulated.

$$S(t) = e^{2\pi(k(t)/4)} \quad (2)$$

where k (t) is the number of modulation phase of the orthogonal modulation signal at time t, and θa is any phase. When it is assumed that an L symbol interval of the UW is τ (0<τ<L·Ts=L/Fs), and n is a frame number, a unique word U (t) is expressed by Formula (3) in a unique word interval τ.

$$U(\tau) = S(n \cdot Tf + \tau) \quad (3)$$

The UW differential detector circuit 100 delays the quasi-synchronized detection signal S100=R (t) with the delay circuit 101a by N symbols (=N·Ts seconds) (N is any positive number), and the N symbol delayed signal S101 is complex conjugated by a complex conjugate circuit 102a. That is, the complex conjugate circuit 102a inverts the code of ImR (t) of the N symbol delayed R (t), and N symbol delays and complex conjugates the quasi-synchronized detection signal R (t) to generate a complex conjugate signal S102. A multiplier 103a multiplies the quasi-synchronized detection signal S100 with the complex conjugate signal S102, that is, N symbol complex conjugates, delays and detects the quasi-synchronized detection signal S100 to generate a data signal differential detection signal S103. The data signal differential detection signal S103 in a τ interval is expressed by Formula (4), where R* is the complex conjugate of the quasi-synchronized detection signal R (t).

$$S103 = R(n \cdot Tf + \tau) \cdot R^*(n \cdot Tf + \tau - N \cdot Ts) \quad (4)$$

On the other hand, a unique word Suw=U (t) of the base band repeating the same signal train as the unique word in the quasi-synchronized detection signal S100 is input into the delay circuit 101b and the complex conjugate circuit 102b. The unique word Suw may insert a signal in the same format as the quasi-synchronized detection signal S100 therebetween. The unique word U (t) also consists of two trains, a real signal component ReU (t) and an imaginary signal component ImR (t). The delay circuit 101b generates an N symbol delayed signal S104 which is the unique word Suw=U (t) delayed by N symbols. The complex conjugate circuit 102b complex conjugates the unique word U (t), that is, inverts the code of ImU (t) to generate a complex conjugate signal S105. A multiplier 103b multiplies the N symbol delay signal S104 with the complex conjugate signal S105, N symbol complex conjugates, delays and detects the unique word Suw to generate a UW differential detection signal S106. The UW differential detection signal S106 is expressed by Formula (5), where U* is complex conjugate of the unique word U (t). The resultant UW differential detection signal S106 is sent to a correlator 104, and stored as a reference for correlation detection.

$$S106\ (\tau) = U\ (\tau - N \cdot Ts) \cdot U^*\ (\tau) \qquad (5)$$

The correlator 104 cross correlates the data signal differential detection signal S103 being sequentially sent and the stored UW differential detection signal S106 over L symbols, or over the entire symbol length of the UW. If N=1, the correlator 104 generates a cross correlation signal S107=D (t) as understood by Formula (6).

$$\begin{aligned} S107(t) &= D(n \cdot Tf + t) \\ &= \int_0^{L/Fs} [S103(t+\tau) \cdot S106(\tau)]d\tau \\ &= \int_0^{L/Fs} [S(n \cdot Tf + t + \tau) \cdot S^*(n \cdot Tf + t + \tau - Ts) \cdot \\ &\quad e^{j2\pi[F_0(n \cdot Tf + t + \tau) + \theta a]} \cdot e^{-j2\pi[F_0(n \cdot Tf + t + \tau - Ts) + \theta a]} \cdot \\ &\quad U(\tau - Ts) \cdot U^*(\tau)]d\tau \end{aligned} \qquad (6)$$

If t=0 where timing of the unique word in the quasi-synchronized detection signal R (t) matches timing of the unique word U (t), Formula (6) can be expressed by Formula (7)

$$S107\ (t=0) = (L/Fs) \cdot e^{j2\pi F_0 Ts} \qquad (7)$$

In Formula (7), the cross correlation signal S107=D (t) has an amplitude of (L/Fs) and a value of phase angle θ of (2 πF0·Ts). That is, a phase term θ is proportional to a product of the frequency offset $F_0$ and the delay time (N×Ts). Alternatively, the frequency offset $F_0$ is expressed as $F_0 = \theta/(2\pi Ts) = \theta \cdot Fs/2\pi$.

The correlator 104 divides the cross correlation signal S107=signal D (t) into a real component Re and an imaginary component Im, and outputs them. That is, the cross correlation signal S107 has a relationship of $(L/Fs) = (Re^2 + Im^2)^{1/2}$ for amplitude, and a relationship of $Re = (L/Fs) \cdot \cos \theta$, $Im = (L/Fs) \cdot \sin \theta$ for the phase term θ.

A UW detector 105 squares the Re and Im of the cross correlation signal S107, respectively, to generate a power value $(L/Fs)^2$. If timing of the unique word in the quasi-synchronized detection signal R (t) matches timing of the unique word U (t), the power value $(L/Fs)^2$ produces a peak at the position of the last symbol of the unique word Suw. The UW detector 105 compares the power value $(L/Fs)^2$ and a predetermined threshold Sth. The threshold Sth is determined by taking into consideration the magnitude of the reception error of the quasi-synchronized detection signal R (t) or the like. If the power value $(L/Fs)^2$ is larger than the threshold Sth, the UW detector 105 produces a UW detection signal S108 indicating that a UW is detected from the quasi-synchronized detection signal S100. The UW detection signal S108 is used as a frame synchronization signal in synchronization demodulation of the quasi-synchronized detection signal S100, or the like.

A UW phase arithmetic unit 106 calculates a phase term θ from the Re and Im contained in the cross correlation signal S107 to generate frequency offset information S109. Here, since the UW phase arithmetic unit 106 calculates the phase term θ of a cross correlation function D (t) as $\tan^{-1}$ (Im/Re), the determinable upper limit of phase term θ is ±π. Therefore, the measurement range of the frequency offset F0 becomes ±Fs/2 or less for Ts=1 (N=1) symbol time.

FIG. 3 shows a measurement rage of the frequency offset $F_0$ for N symbols, amount of delay for the quasi-synchronized detection signal R (t) and the unique word U (t) in the UW differential detector circuit 100. That is, the measurement range of the frequency offset $F_0$ is inversely proportional to the number of delay symbols N. On the other hand, resolution of the frequency offset $F_0$ (frequency resolution) would be proportional to the amount of delay N. The frequency offset information S109 is used as correction information for carrier frequency offset in the synchronous demodulation of the quasi-synchronized detection signal S100, or the like.

The above-mentioned conventional unique word differential detection system has features not only being capable of detecting a unique word even if there is a carrier frequency offset, but also being fast in detecting the unique word.

However, the conventional unique word differential detection system has the first problem that, as shown in FIG. 3, the measurement range of carrier frequency offset is in a relationship of tradeoff with the resolution, so that both cannot be simultaneously enhanced.

The second problem lies in that the unique word differential detection system does not have a measure for protecting false detection of the unique word.

In addition, the third problem lies in that, when the carrier frequency offset has a high magnitude, the unique word differential detection system cannot prevent a unique word detection capability from being deteriorated due to noise and adjacent channel interference (ACI), and noise containing ACI from being increased in a signal supplied to a demodulator.

Furthermore, the forth problem lies in that in estimating timing of the unique word by the unique word differential detection system, signal processing speed is reduced when estimation accuracy is increased.

SUMMARY OF THE INVENTION

The present invention is intended to provide a unique word differential detection system which can solve the first to fourth problems in the prior art.

The unique word differential detection system according to the present invention mainly solves the first and fourth problems in the prior art, detects the position of the UW with a high accuracy, and expands a measurement range for frequency offset of the quasi-synchronized detection signal while maintaining the measurement accuracy at a high level. To this end, it maintains the operating state of an initial acquisition mode (hereinafter abbreviated as an IA mode) which comprises a plurality of UW differential detector delay circuits each having different number of delay symbols, the UW differential detector delay circuit being based on the UW differential detector circuit 100. An IA mode UW differential detector delay circuit used in the IA mode comprises a UW differential detector delay circuit with the number of delay symbols N (where 0.5<N≦1) (hereinafter abbreviated as DDD (N)), and a UW differential detector delay circuit with N'=N/2 (hereinafter abbreviated as DDD (N/2)). An IA mode UW detector circuit responds to cross correlation signals output from the DDD (N) and DDD (N/2), respectively, and generates an IA mode UW detection signal indicating detection of unique word from a first supplied quasi-synchronized detection signal, and an IA mode frequency offset information indicating the frequency offset $F_0$ of the first quasi-synchronized detection signal.

The unique word differential detection system according to the present invention mainly solves the second and third problems in the prior art, and performs a fine tune acquisition mode (hereinafter abbreviated as the FA mode) after detection of the UW in the IA mode. For the FA mode, it comprises an FA mode UW differential detection delay circuit with the number of delay symbols M (where, 1<M) (hereinafter abbreviated as the DDD (M)). An FA mode UW detector circuit responds to a cross correlation signal output from the DDD (M), and generates at least an FA mode UW detection signal indicating detection of a unique word from a second quasi-synchronized detection signal corresponding to the first quasi-synchronized detection signal.

To apply the unique word differential detection system to a decoder, when the FA mode UW detection signal occurs, the present invention terminates the UW detection operation and turns to a steady state mode (hereinafter abbreviated as the SS mode) to demodulate the data signal by synchronously detecting the second quasi-synchronized detection signal. The above-mentioned unique word differential detection system and the demodulator according to the present invention are frequently constituted by a digital signal processor (DSP in the following) in which a microprocessor and a storage circuit are controlled by software.

DESCRIPTION OF THE PREFERRED EMBODIMENTS

Figure 4:
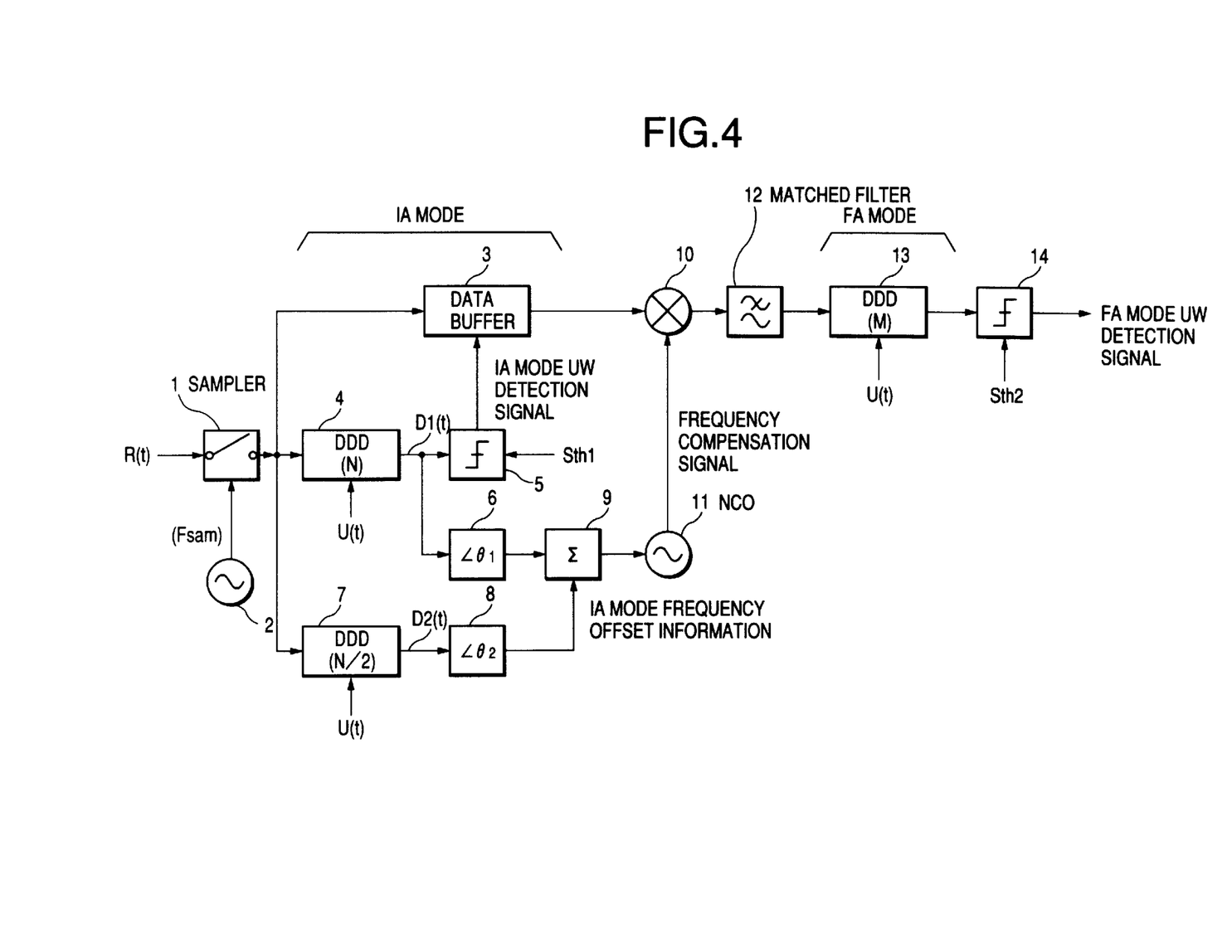
FIG. 4 is a block diagram showing a first embodiment of the unique word differential detection system according to the present invention.

FIG. 4 is a block diagram showing a first embodiment of the unique word differential detection system according to the present invention. A sampling signal generator 2, which generates a sample rate Fsam of N/symbol or more, samples a first quasi-synchronized detection signal R (t) which is a quasi-synchronized detected orthogonal modulation signal with a known UW inserted in a data signal. The unique word U(t) is also supplied to a DDD (N) 4 and DDD (N/2) 7. Its output is supplied to a DDD (N) 4 and a DDD (N/2) 7. The DDD (N) 4 cross correlates an N symbol complex conjugate differential detection signal of the sampled first quasi-synchronized detection signal with an N symbol complex conjugate differential detection signal of the UW to generate a first cross correlation signal D1 (t). The DDD (N/2) 7 cross correlates an N/2 symbol complex conjugate differential detection signal of the sampled quasi-synchronized detection signal with an N/2 symbol complex conjugate differential detection signal of the UW to generate a second cross correlation signal D2 (t).

A first UW detector circuit 5 generates an IA mode UW detection signal when a power value of the first cross correlation signal D1 (t) exceeds a first threshold Sth1. The IA mode UW detection signal determines the position of UW, or a frame timing of the first quasi-synchronized detection signal.

A first UW phase arithmetic circuit 6 generates a phase value θ1 from the first cross correlation signal D1 (t), and a second UW phase arithmetic circuit 8 generates a phase value θ2 from the second cross correlation signal D2 (t). Here, the phase values θ1 and θ2 have a determinable upper limits of ±π. Since a phase value θ=2 πF₀·Ts, a measurable range Fom 1 of frequency offset $F_0$ at the phase value θ1≦±π is N·Ts=1. Accordingly, Fs=1/Ts yields ±Fom 1≦±Fs/2. Similarly, a measurable range Fom 2 of frequency offset $F_0$ at the phase value θ2≦±π is N·Ts=½. Accordingly, Fs=2/Ts yields ±Fom 2≦±Fs. For 0≦θ1<±π, a phase synthesizer 8 provides the phase value θ1 IA mode frequency offset information. For the phase value |θ2|≧π/2, the phase synthesizer provides the IA mode frequency offset information (2 π+θ1) (where, θ2≧π/2) and (θ1−2 π) (where, θ2≦−π/2). Carrier frequency offset information can be obtained from the phase value θ1 with a high accuracy, and the phase value θ2 can expand the measurement range of the carrier frequency offset $F_)$ to ±Fs/2 to ±Fs. Accordingly, the phase synthesizer expands the measurement range of carrier frequency offset $F_0$ to ±Fs, and provides carrier frequency offset information with a high accuracy.

Figure 5:
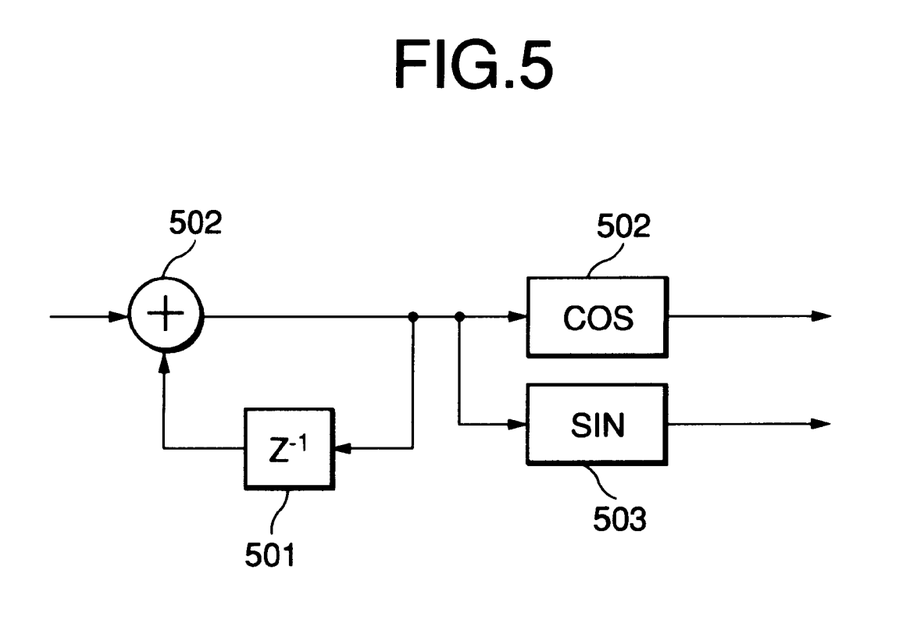
FIG. 5 is a block diagram of NCO 11 in FIG. 4.

When the IA mode UW detection signal is output, the detection system laters the FA mode. Here, the sampled first quasi-synchronized detection signal R (t) is stored in a first data buffer 3 in the IA mode. In receiving an IA mode UW detection signal, the first data buffer outputs the first quasi-synchronized detection signal stored therein to a first multiplier 10. A first numerical control oscillator circuit (NCO) 11 outputs a frequency compensation signal responsive to IA mode frequency offset information to the first multiplier 10. The NCO 11 may have, for example, an arrangement shown by a block diagram of FIG. 5. That is, output of an integrating circuit consisting of a one-sample delay element 501 and a multiplier 502 can be obtained through a cosine converter circuit 502 and a sine converter circuit 503 which divide the output into a real component and an imaginary component. The first multiplier 10 multiplies the first quasi-synchronized detection signal from the first data buffer 3 and the frequency compensation signal to generate a second quasi-synchronized detection signal. Here, the frequency compensation signal is a signal which compensates the frequency offset of the second quasi-synchronized detection signal to be lowered close to zero through multiplication of the first quasi-synchronized detection signal.

The second quasi-synchronized detection signal is supplied to the DDD (M) 13 (where, 1<M), an FA mode UW differential detection delay circuit, through a matched filter 12 which reduces noise and adjacent channel interference. The DDD (M) 13 cross correlates an M symbol complex conjugate differential detection signal of the second quasi-synchronized detection signal and an M symbol complex conjugate differential detection signal of the UW to generate an FA mode cross correlation signal. An FA mode UW detector circuit 14 has the same arrangement as the IA mode UW detector circuit 4, and generates an FA mode UW detection signal when power value of the FA mode cross correlation signal exceeds a second threshold Sth2.

That is, since the unique word differential detection system of the present invention generates the UW detection signal also in the FA mode following the IA mode, the system has a capability to generate the UW detection signal in duplicate, and thus can prevent false detection of UW. Since the FA mode UW detection signal determines the position of UW at higher accuracy than the IA mode UW detection signal, it can be desirably used as a frame synchronization signal of the data signal instead of the IA mode UW detection signal. In addition, it is possible to obtain frequency offset information with higher resolution from the FA mode cross correlation signal than in IA mode.

Figure 6:
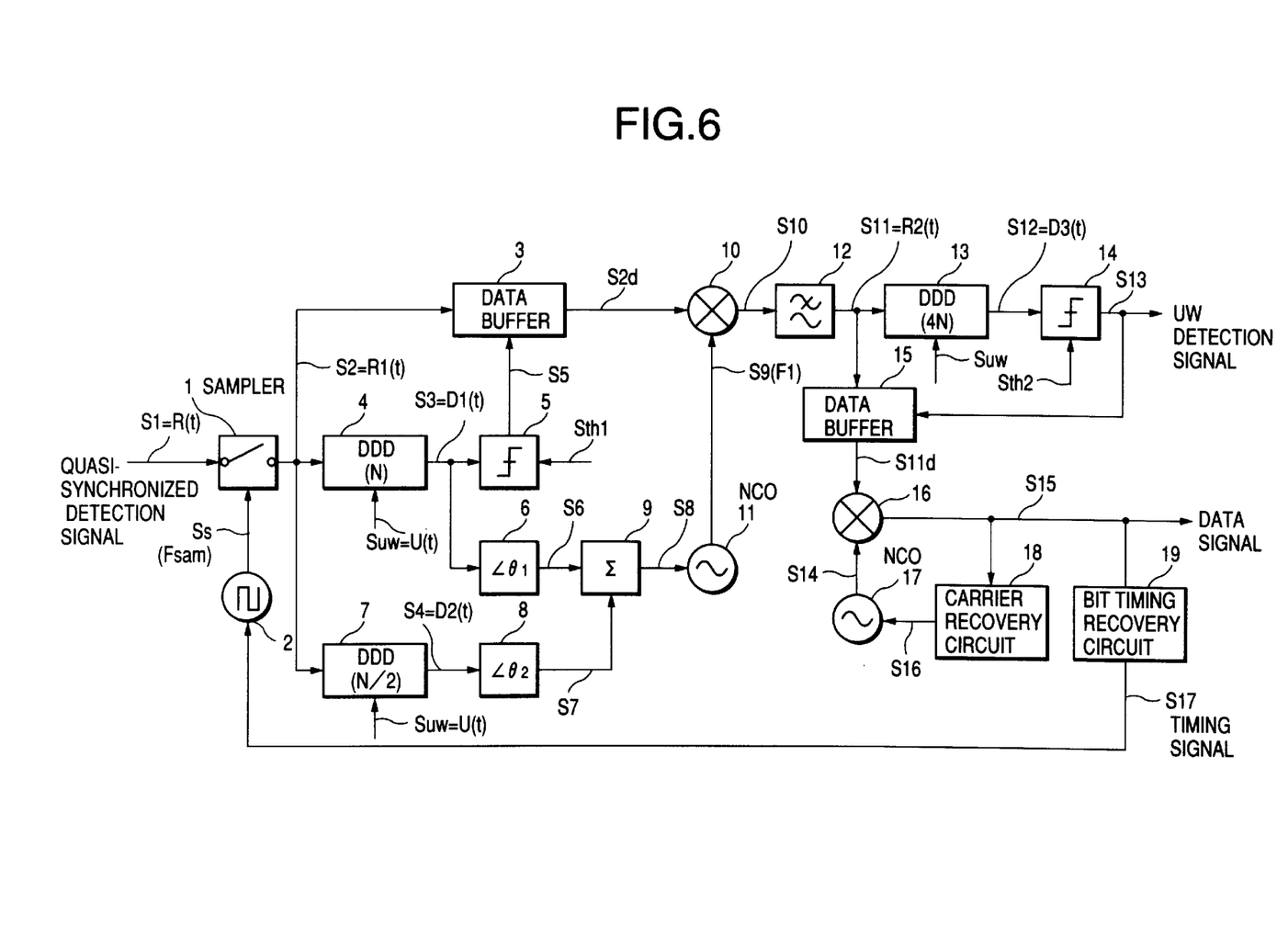
FIG. 6 is a block diagram showing a demodulator using the unique word differential detection system of FIG. 4.

Now, description is given on a frame-synchronized demodulator using the UW differential detector shown in FIG. 4. FIG. 6 is a block diagram of a demodulator determining a frame position with the unique word differential detection system of FIG. 4, that is, attaining frame synchronization. The demodulator is constituted by a digital signal processor (DSP) in which a microprocessor and a storage circuit are controlled by software.

The unique word differential detection system according to the circuit of FIG. 6 comprises three DDDs having a number of delay symbols, that is, a DDD (N) 4 with N=1, a DDD (N/2) 7 with N=½, and DDD (4N) 13 with N (M)=4, which are based on the UW differential detection circuit 100. The DDD (N) 4 and DDD (N/2) 7 are used in the initial acquisition (IA) mode of UW, while the DDD (4N) is used in the fine tune acquisition (FA) mode of UW.

The circuit is first in the IA mode. In the IA mode, the DSP activates a sampler 1, a sampling signal generator 2, a data buffer 3, the DDD (N) 4, a UW detector 5, UW phase arithmetic units 6 and 8, the DDD (N/2) 7, and a phase synthesizer 9.

In the IA mode, supplied to the sampler 1 is a first quasi-synchronized detection signal S1=R (t) which is a quasi-synchronized detected orthogonal modulation signal with a known UW inserted in a data signal. The sampler 1 samples the quasi-synchronized detection signal S1 with a sampling signal Ss with a sample rate of Fsam of 4N/symbol to generate a quasi-synchronized detection signal S2 which is a digital signal equivalently expressed by a function R1 (t), and supplies the signal S2 to the DDD (N) 4, the DDD (N/2) 7 and the data buffer 3. The sampling signal Ss generated by a sampling signal generator 2 does not perfectly synchronize the symbol of the quasi-synchronized detection signal S1 in the IA mode. A unique word Suw=U (t) is also supplied to the DDD (N) 4 and the DDD (N/2) 7.

The DDD (N) 4 cross correlates a one-symbol (=Ts) complex conjugate differential detection signal of the quasi-synchronized detection signal S2 and a one-symbol complex conjugate differential detection signal of the unique word Suw, to generate a cross correlation signal S3=D1 (t). The DDD (N/2) 7 cross correlates a ½-symbol complex conjugate differential detection signal of the quasi-synchronized detection signal S2 and a ½-symbol complex conjugate differential detection signal of the unique word Suw to generate a cross correlation signal S4=D2 (t). These operations are similar to those of the UW differential detector circuit 100 described with reference to FIGS. 2 and 3. The function D1 (t) is same as the D (t) of Formula (6), and the function D2 (t) is a function in which the symbol delay time Ts of the function D (t) is replaced with Ts/2.

The UW detector 5 squares the cross correlation signal S3 to generate a power value $(L/Fs)^2$, and generates an IA mode UW detection signal S5 when the power value $(L/Fs)^2$ exceeds a predetermined first threshold Sth1. The threshold Sth1 is determined by taking into consideration the S/N ratio of the quasi-synchronized detection signal S1 or the like. The IA mode Uw detection signal S5 determines the position of UW, or frame timing of the quasi-synchronized detection signal S2. For the cross correlation signal S4, the UW detection operation is not performed to shorten signal processing time of the DSP.

A UW phase arithmetic unit 6 generates phase information S6 indicating the phase value θ1 from the phase term of the cross correlation signal S3. In addition, a UW arithmetic unit 8 generates phase information S7 indicating the phase value θ2 from the phase term of the cross correlation signal S4. Here, the determinable upper limit of the phase value θ1 is ±π. Since the phase value θ=2 πF₀·Ts, a measurable range Fom 1 of frequency offset F0 at the phase value θ1≦±π is N·Ts=1. Accordingly, Fs=1/Ts yields ±Fom 1≦±Fs/2. Similarly, a measurable range Fom 2 of frequency offset F₀ at the phase value θ2≦±π is N·Ts=½. Accordingly, Fs=2/Ts yields ±Fom 2≦±Fs.

A phase synthesizer 9 responds to the phase information S6 and S7 to generate IA mode frequency offset information S8 indicating the carrier frequency offset of the quasi-synchronized detection signal S2. When the phase value θ2 of the phase information S8 satisfies |θ2|<π/2, the phase synthesizer 9 determines the phase value θ1 of the phase information S6 to be the frequency offset information S8. For the phase value |θ2|<π/2, the phase synthesizer 9 determines the IA mode frequency offset information S8 to be (2 π+θ1) (where, θ2≧π/2) and (θ1-2 π) (where, θ2≦-π/2). The phase value θ1 can provide carrier frequency offset information with a high accuracy, and the phase value θ2 can expand the measurement range of carrier frequency offset F₀ from ±Fs/2 to ±Fs. Accordingly, the phase synthesizer 9 expands the measurement range of carrier frequency offset F₀ to the symbol frequency (±Fs), and generates IA mode frequency offset information S8 with a high accuracy.

When the UW detector 5 outputs the IA mode UW detection signal S5 to the data buffer 3, the circuit of FIG. 6 laters the FA mode. When it laters the FA mode, the DSP activates a multiplier 10, a numerical control oscillator (NCO) 11, a matched filter 12, the DDD (4N) 13, a false UW detector 14, and a data buffer 15. The multiplier 10 and the NCO 11 should be in a perfect operation state when the FA mode is started, and may be immediately activated in the IA mode. Here, the data buffer 3 should store a data signal having several symbols in addition to UW (number of symbols L) of the quasi-synchronized detection signal S2. Amount of data signal storage is determined by taking into consideration the processing speed in detecting UW in the IA mode. The data buffer 3 sequentially discards the received quasi-synchronized detection signal S2 from older data signals when the memory becomes full until a UW is detected.

When the data buffer 3 receives the IA mode UW detection signal 5, it reads the quasi-synchronized detection signal S2d stored in the buffer to the multiplier 10. On the other hand, the NCO 11 responds to the IA mode frequency offset information S8 to generate a frequency compensation signal S9. A frequency F1 of the frequency compensation signal S9 substantially equals the frequency offset F₀ indicated by the frequency offset information S8.

The DSP deactivates the DDD (N) 4, the DDD (N/2) 7, the UW detector 5, the UW phase arithmetic units 6 and 8, and the phase synthesizer 9 when the phase synthesizer 9 loads the IA mode frequency offset information S8 in the NCO 11. In this state, the data buffer 3 continues to output the quasi-synchronized detection signal S2 from the sampler 2, and the NCO 11 continues to output the frequency compensation signal S9 with frequency F1.

The multiplier 10 multiplies the quasi-synchronized detection signal S2d and the frequency compensation signal S9 to generate a second quasi-synchronized detection signal S10 in which the frequency offset is reduced substantially to zero. The quasi-synchronized detection signal S10 is supplied to the DDD (4N=M) 13 and the data buffer 15 as a quasi-synchronized detection signal S11=R2 (t) through the matched filter 12. The matched filter 12 may be a Nyquist filter. Since the carrier frequency offset of the quasi-synchronized detection signal S10 is $(F_0-F1) \approx 0$ through multiplication of the quasi-synchronized detection signal S2d and the frequency compensation signal S9, the matched filter 12 reduces noise and ACI in the quasi-synchronized detection signal S11 which it outputs to a substantially optimum level.

The DDD (4N) 13 performs signal processing in response to the quasi-synchronized detection signal S11 in the same signal arrangement as the UW stored in the data buffer 3 in the IA mode, or the UW signal processed by the DDD (N) 4 and DDD (N/2) 7, and the unique word Suw. The DDD (4N) 13 cross correlates a 4N symbol complex conjugate differential detection signal of UW contained in the quasi-synchronized detection signal S11 and a 4N symbol complex conjugate differential detection signal of the unique word Suw to generate a cross correlation signal S12=D3 (t). The arrangement and operation of the DDD (4N) 13 are also the same as the UW differential detector circuit 100. The false UW detector 14 has the same arrangement as the UW detector 5, and generates an FA mode UW detection signal S13 when the power value of the cross correlation signal S12 exceeds a predetermined threshold Sth2.

The unique word differential detection system of FIG. 6 generates the UW detection signal S13 also in the FA mode following the IA mode, that is, has a capability to generate a UW detection signal in duplicate, so that it can prevent false detection of UW. Since UW detection by the DDD (N) 4 differs from UW detection by the DDD (4N) 13 in the number of delay symbols even if using a same received UW, they appear as if they handle different signals, so that a double check effect on UW detection is enhanced. Here, while the circuit of FIG. 5 exemplifies the DDD (M) 13, by the DDD (4N) indicating four-symbol complex conjugate differential detection, the effect can be attained for the time being if the number of delay symbols M is larger than one for the DDD (M) 13.

Since the DDD (4N) 13 handles the quasi-synchronized detection signal S11 which passes through the matched filter 12, and for which noise and adjacent channel interference are reduced, error in UW detection is lower than in the IA mode. In addition, since the number of delay symbols of the DDD (4N) 13 is also larger than in the IA mode, the UW detection signal S13 determines the position of UW with higher accuracy than the UW detection signal S5. Therefore, once the FA mode is established, it is preferable to use the UW detection signal S13 instead of the UW detection signal S5 as a frame synchronization signal for a received data signal. In addition, it is possible to obtain from the cross correlation signal S13 frequency offset information which has higher frequency resolution that in the IA mode by using a UW phase arithmetic unit similar to the UW phase arithmetic unit 5.

If the false UW detector 14 does not output the FA mode UW detection signal S13 in the FA mode, the DSP returns the UW detection operation to the IA mode even if the IA mode UW detection signal S5 in the IA mode is a false UW detection. In other words, the DSP activates again the DDD (N) 4, the UW detector 5, the UW phase arithmetic units 6 and 8, the DDD (N/2) 7, and the phase synthesizer 9, and deactivates at least the matched filter 12, the DDD (4N) 13, the false UW detector 14, and the data buffer 15. Thereafter, UW detection is resumed in the IA mode.

When the FA mode UW detection signal S13 is output, the circuit of FIG. 6 turns to the steady state (SS) mode for synchronously detecting a quasi-synchronized detection signal S11d, and demodulating it to a data signal S15. Once the SS mode is established, the DSP activates a multiplier 16, a numerical control oscillator (NCO) 17, a carrier recovery circuit (CR) 18, and a bit timing recovery circuit (BTR) 19. Here, in the UW detection in the FA mode, the data buffer 15 stores UW in the quasi-synchronized detection signal S11 and data for several symbols following that UW. Amount of data signal storage of the data buffer 15 is also determined by taking into consideration the processing speed of UW detection in the FA mode.

When the data buffer 15 receives the FA mode UW detection signal S13, it reads the stored quasi-synchronized detection signal S11, and outputs it as a quasi-synchronized detection signal S11d to the multiplier 16. Subsequently, the DSP deactivates at least the DDD (4N) 13, and the false UW detector 14. In this state, the data buffer 15 continues to output the quasi-synchronized detection signal S11 from the matched filter 12 as the quasi-synchronized detection signal S11d.

The multiplier 16 synchronously detects the quasi-synchronized detection signal S11d with the in-phase local oscillator signal S14 from the NCO 17, and demodulates it to a data signal S15. Here, the NCO 17 responds to a symbol clock S16 recovered from the data signal S15 by the CR 18 to generate an in-phase local oscillator signal S14 in-phase with the carrier of the quasi-synchronized detection signal S11d. In addition, the BTR 19 recovers the symbol clock from the data signal 15, and generates a timing signal S17 synchronized with the symbol clock. The timing signal S17 is used in the SS state as a synchronization signal for a sampling signal Ss generated from the sampling signal generator 2.

While, in the embodiment of FIG. 6, the demodulator circuit consisting of the multiplier 16, the numerical control oscillator (NCO) 17, the carrier recovery circuit (CR) 18, and the bit timing recovery circuit (BTR) 19 synchronously detects the second quasi-synchronized detection signal S11d from the data buffer 15, the demodulator circuit may synchronously detect the quasi-synchronized detection signal S11 from the matched filter 12 to recover a data signal. That is, the demodulator circuit may enter the demodulation operation for the quasi-synchronized detection signal immediately after completion of the IA mode. However, in this case, a function is not added for preventing false detection of UW.

In addition, the UW detection operation in the FA mode may be performed simultaneously with the UW detection operation in the IA mode upon reception of the first quasi-synchronized detection signal S2. If both the IA mode UW detection signal and the FA mode UW detection signal occurs, it would be that UW is successfully detected. Once UW is successfully detected, the first quasi-synchronized detection signal S2d is read from the data buffer 3, and supplied to the demodulator circuit.

Figure 7:
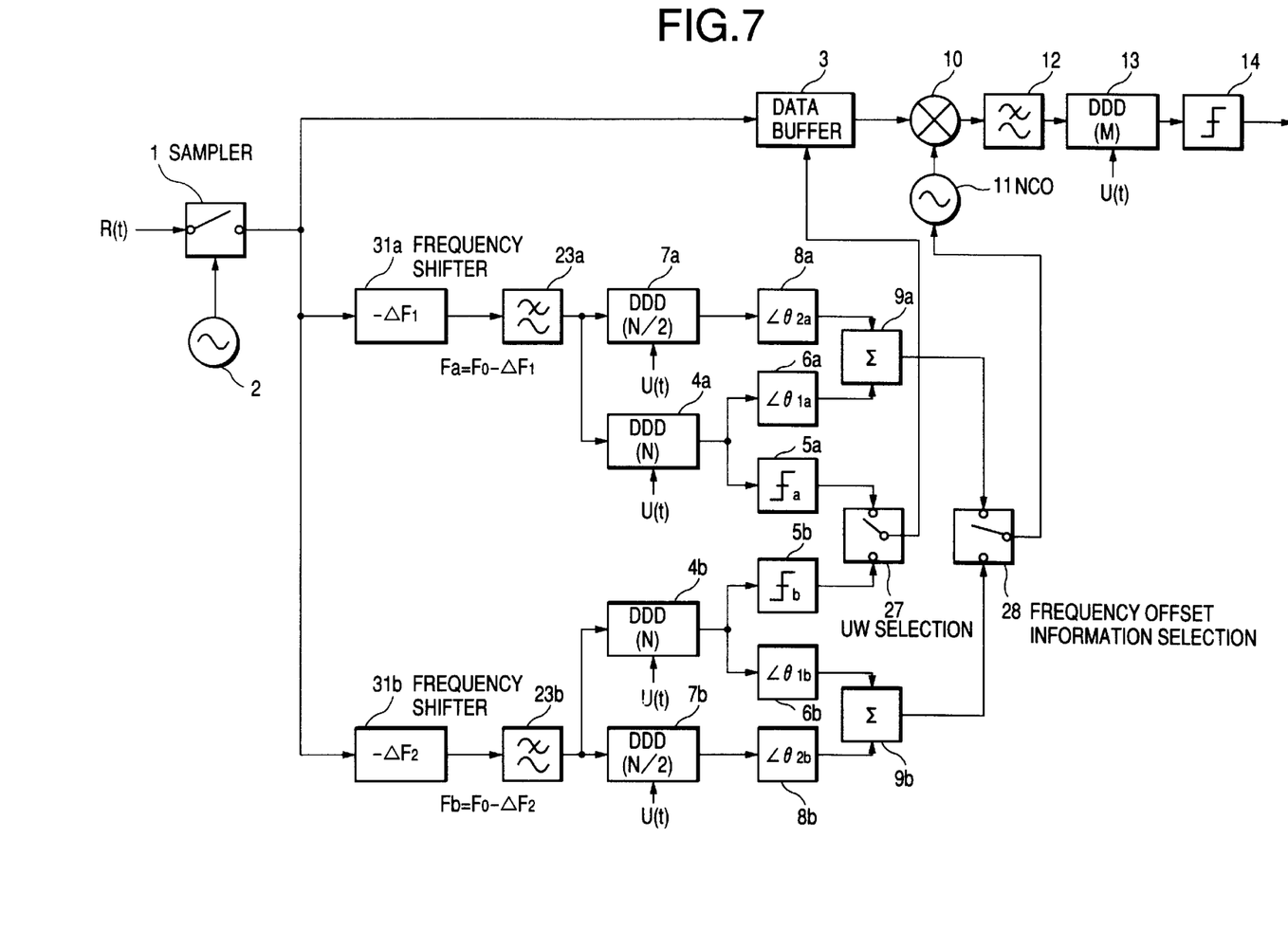
FIG. 7 is a block diagram showing a second embodiment of the unique word differential detection system according to the present invention.

Now, a second embodiment of the UW differential detector is described with reference to the block diagram of FIG. 7. In the figure, it is same as in the above-mentioned arrangement in that the differential detection UW and the synchronized detection demodulation of data signal are performed through three stages of IA mode, FA mode, and SS mode. However, it differs in the arrangement and operation for performing the IA mode. The unique word differential detection system according to FIG. 7 is primarily intended to reduce noise and adjacent channel interference in the second quasi-synchronized detection signal supplied to the DDD (N) and the DDD (N/2) in the IA mode, and to detect the IA mode UW detection signal and the carrier frequency offset with high accuracy and at a high speed.

The first quasi-synchronized detection signal R (t) is sampled in a sampler 1 by a sampling signal generator 2 which generates a sample rate Fsam of N/symbol. The sampled first quasi-synchronized detection signal is frequency shifted to a carrier frequency offset $F_0$ by a first frequency $\Delta F1$ by a frequency shifter 31a, and for the frequency offset $F_0$ by a second frequency $\Delta F2$ differing from the first frequency $\Delta F1$ by a frequency shifter 31b. When the maximum carrier frequency offset of the quasi-synchronized detection signal R (t) is estimated to be ±Fom, if $\Delta F1=-\Delta F2=Fom/2$, at least one of the frequency sifted first quasi-synchronized detection signals is improved by a frequency offset $F_0$ to Fom/2 or less.

The first quasi-synchronized detection signal with frequency offset of $(F_0-\Delta F1)=Fa$ and the first quasi-synchronized detection signal with frequency offset of $(F_0-\Delta F2)=Fb$ are input into low pass filters (LPFs) 23a and 23b, respectively. They are band limited by the LPFs 23a and 23b, which reduce noise and adjacent channel interference, and then are supplied to DDD (N) 4a and 4b, and DDD (N/2) 7a and 7b which are similar to those described above. Cross correlation signals output by the DDD (N) 4a and 4b are supplied to UW detectors 5a and 5b, and UW phase arithmetic units 6a and 6b to generate UW detection signals, and phase values θ1a and θ1b of the cross correlation signals similar to those described above. In addition, cross correlation signals output by the DDD (N/2) 7a and 7b are supplied to UW phase arithmetic units 8a and 8b to generate phase values θ2a and θ2b of the cross correlation signals similar to those described above. A second phase synthesizer 9a is supplied with the phase values θ1a and θ2a to generate second carrier frequency offset information similar to that described above. A third phase synthesizer 9b is supplied with θ1b and θ2b to generate third carrier frequency offset information similar to that described above.

A UW selector 27 compares the magnitude of UW detection signal generated based on the first quasi-synchronized detection signal with frequency offset Fa and that of UW detection signal generated based on the first quasi-synchronized detection signal with frequency offset Fb, selects the UW detection signal with the larger value as an IA mode UW detection signal, and supplies it to the first data buffer 3. Here, the smaller frequency offset for the first quasi-synchronized detection signal provides lower signal distortion by the band limitation, and lower detection error in the IA mode detection signal. The selected IA mode UW detection signal is also supplied to a frequency offset information selector 28.

The frequency offset information selector 28 selects the carrier frequency offset information which uses the cross correlation signal providing the IA mode detection signal as IA mode frequency offset information, and sends it to the first numerical control oscillator 11 for frequency compensation. Since the IA mode frequency offset information can further reduce frequency error in the frequency compensation signal generated by the first numerical control oscillator 11 by the structure shown in FIG. 4, it serves to reduce frequency offset of the second quasi-synchronized detection signal supplied to the matched filter 12. Accordingly, the spectrum of the second quasi-synchronized detection signal closely matches the frequency characteristics of the matched filter 12. Thus, it can reduce noise and adjacent channel interference applied to the second data buffer from the DDD (M) 13 used in the FA mode or the demodulator circuit used in the SS mode.

The signal processing time by the UW phase arithmetic units 8a and 8b and the UW phase detectors 5a and 5b can be further shortened by toggle sampling two cross correlation signals output from the DDD (N) 4a and 4b and the DDD (N/2) 7a and 7b, respectively, with one half sampling rate of the first quasi-synchronized detection signal.

Figure 8:
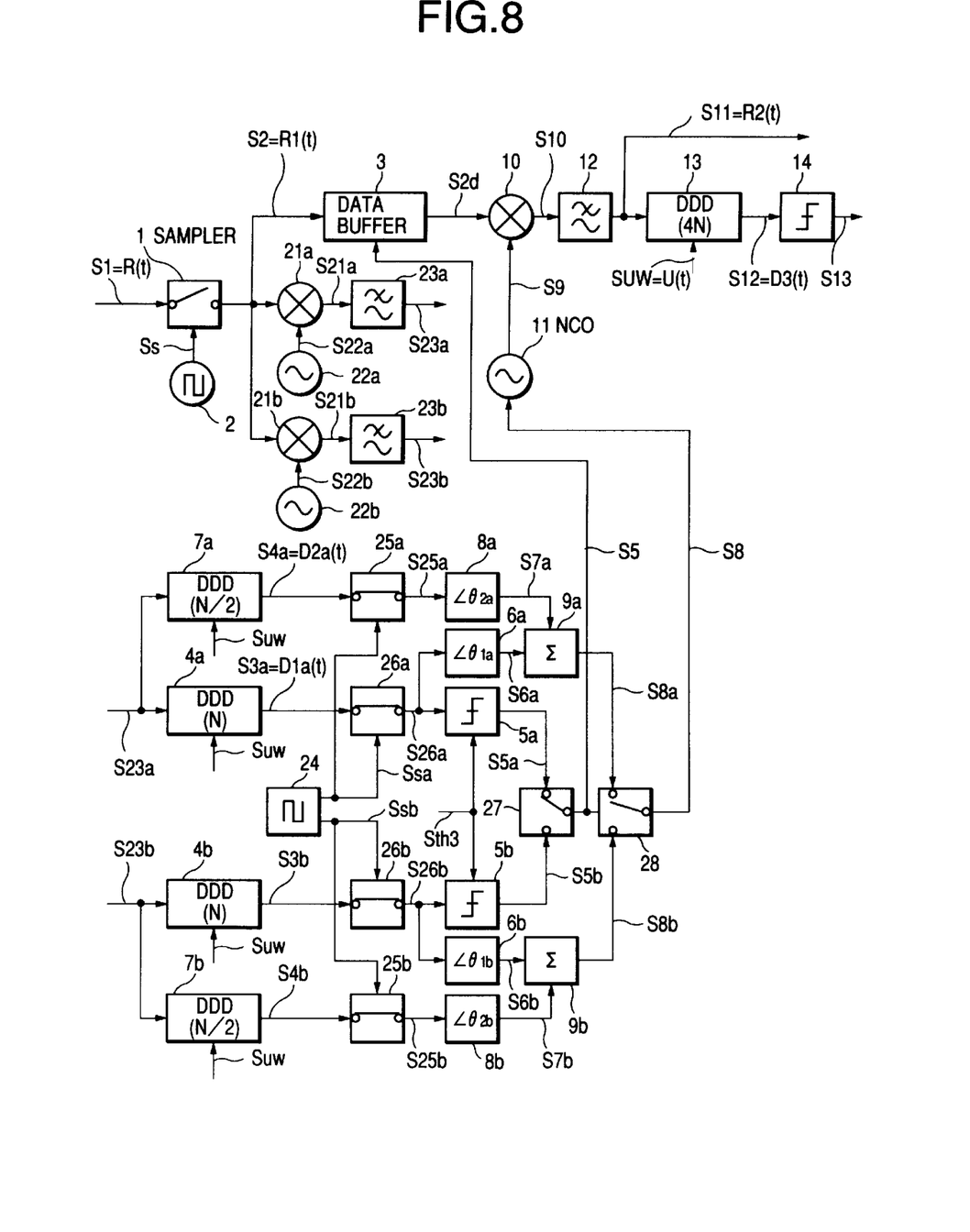
FIG. 8 is a block diagram showing a demodulator using the unique word differential detection system of FIG. 7.

FIG. 8 shows a block diagram of a demodulator using the UW differential detector shown in FIG. 7.

FIG. 8 also shows a demodulator for frame synchronization with the unique word differential detection system. The demodulator is also constituted by a DSP in which a microprocessor and a storage circuit are controlled by software. FIG. 8 omits illustration of the data buffer 15, the multiplier 16, the NCO 16, the CR 18, and BTR 19 which are shown in FIG. 6.

The unique word differential detection system and the demodulator of FIG. 8 is same as the demodulator of FIG. 1 in that it performs differential detection of UW, and synchronized detection and demodulation of a data signal through three stages of IA mode, FA mode, and SS mode. However, it differs in the circuit configuration and operation for performing the IA mode from the embodiment of FIG. 6. This embodiment is primarily intended to quickly detect the IA mode UW detection signal S5 and the carrier frequency offset information S8 at a high accuracy by reducing noise and adjacent channel interference in a quasi-synchronized signal S23a or S23b supplied to the DDD (N) 4a and 4b and DDD (N/2) 7a and 7b in the IA mode. In the following, the operation of IA mode in this embodiment is described with reference to FIGS. 2 and 3.

Figure 9:
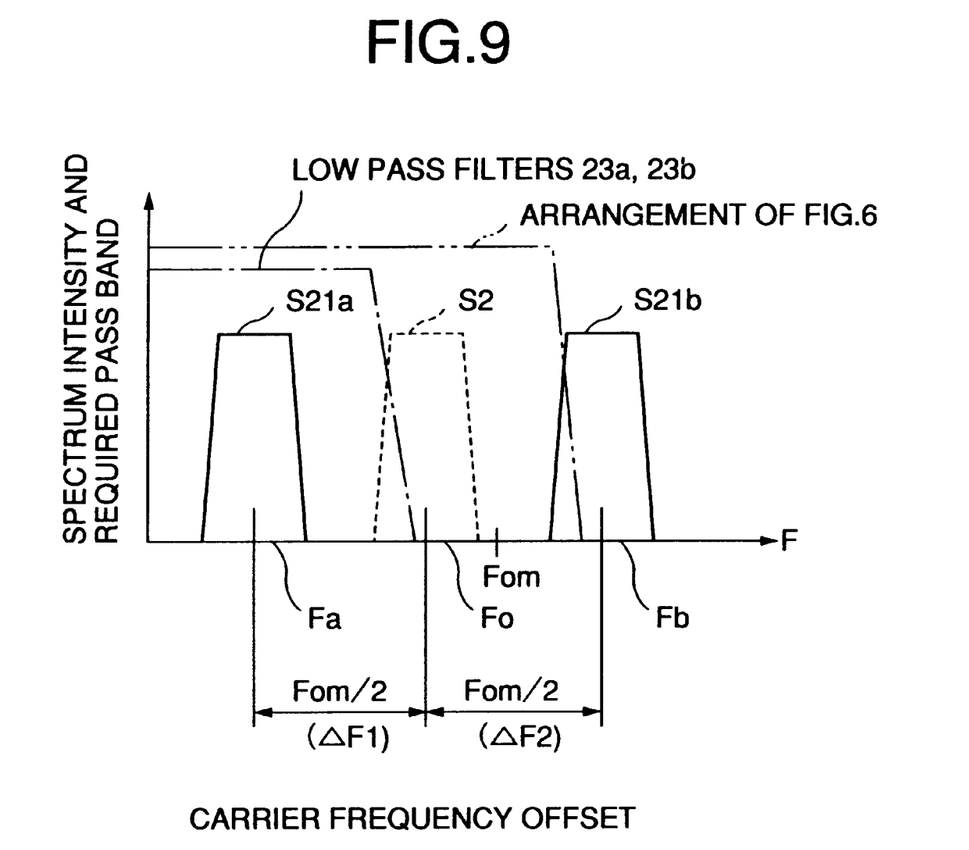
FIG. 9 is a relationship of carrier offset frequency and spectrum intensity.

Also in the circuit of FIG. 8, the quasi-synchronized detection signal S1=R (t) is sampled by a sampler 1 at a sample rate Fsam of N/symbol or more generated by a sampling signal generator 2, and turned into a quasi-synchronized detection signal S2=R1 (t). The signal S2 is divided into two as a signal for the UW differential detection system. One of them becomes a quasi-synchronized detection signal S23a with carrier frequency offset Fa in which the carrier frequency offset $F_0$ is shifted by a first frequency $\Delta F1$. The other becomes a quasi-synchronized detection signal S23b with carrier frequency offset Fb in which the frequency offset $F_0$ is shifted by a first frequency $\Delta F2$ which is different from the first frequency $\Delta F1$. When the maximum carrier frequency offset of the quasi-synchronized detection signal S2 is estimated to be Fom, if $\Delta F1=-\Delta F2=Fom/2$, at least one of the frequency sifted first quasi-synchronized detection signals S23a and S23b is improved by a frequency offset $F_0$ to Fom/2 or less. FIG. 9 shows a relationship of carrier offset frequency and spectrum intensity. In the following, description is given with reference to this figure.

Now, frequency shift of the quasi-synchronized detection signal S2 is described in detail. An oscillator 22a generates a local oscillator signal S22a with frequency $\Delta F1$. A multiplier 21a frequency mixes the quasi-synchronizes signal S2 and the local oscillator signal S22a to generate a quasi-synchronized detection signal S21a with carrier frequency offset Fa=$(F_0-\Delta F1)$. In addition, an oscillator 22b generates a local oscillator signal S22b with frequency $\Delta F2$. An multiplier 21b frequency mixes the quasi-synchronizes signal S2 and the local oscillator signal S22b to generate a quasi-synchronized detection signal S21b with carrier frequency offset Fb=($F_0$−ΔF2). Consequently, as long as the carrier frequency offset F0 of the quasi-synchronized detection signal S2 is Fom or less, at least one of the quasi-synchronized detection signals S21a and S21b is improved for the carrier frequency offset $F_0$ to Fom/2 or less.

To reduce noise and adjacent channel interference, the quasi-synchronized detection signals S21a and S21b are low pass filtered by low pass filters 23a and 23b, and turned to be quasi-synchronized detection signals S23a and S23b, respectively. Now, if, in the circuit of FIG. 8, the band width of signal S2 is BW, and the frequency offset is Fom, the quasi-synchronized signal S2 should pass through a low pass circuit or low pass filter with a band width of (Fom+BW) or more to supply the quasi-synchronized detection signal S2 without signal distortion to the DDD (N) 4 and DDD (N/2) 7. That is, the noise band of the quasi-synchronized detection signal S2 is (Fom+BW) or more.

On the other hand, this embodiment uses only one of the quasi-synchronized detection signals S21a and S21b for UW detection, as described later. Therefore, the band width of low pass filters 23a and 23b is sufficient to be (Fom/2+BW). Then, either one of the signals S21a and S21b are improved in the noise band over the circuit of FIG. 6 by Fom/2 without causing signal distortion. That is, the IA mode UW detection according to this embodiment can quickly output the IA mode UW detection signal S5 and the frequency offset information S8 at a high accuracy by reducing noise and adjacent channel interference in the quasi-synchronized detection signals S23a and S23b supplied to the DDD (N) 4a and 4b, and the DDD (N/2) 7a and 7b. This effect is particularly significant when the estimated maximum value Fom of frequency offset is large when compared with the band width of quasi-synchronized detection signal S2.

The circuit of FIG. 8 causes each of the quasi-synchronized detection signals S23a and S23b to perform the UW detection similar to the IA mode of FIG. 6 and generation of carrier frequency offset information. The quasi-synchronized detection signals S23a and S23b are supplied to the DDD (N) 4a and 4b, and the DDD (N/2) 7a and 7b, respectively. The DDD (N) 4a and 4b, and the DDD (N/2) 7a and 7b are supplied with a unique word Suw, respectively. The DDD (N) 4a and 4b output a cross correlation signal S3a=D1a (t) and S3b. The DDD (N/2) 7a and 7b output a cross correlation signal S4a=D2a (t) and S4b. The DDD (N) 4a and 4b perform the same operation as the DDD (N) 4 of FIG. 6, and the DDD (N/2) 7a and 7b perform the same operation as the DDD (N/2) 7 of FIG. 6.

Here, the circuit of FIG. 8 comprises a sampling signal generator 24, and samplers 25a, 25b, 26a and 26b. The sampling signal generator 24 outputs a sampling signal with 4N/symbol (N=1), which is alternately output as sampling signals Ssa and Ssb. That is, the sampling signal generator 24 outputs the sampling signals Ssa and Ssb which are toggle sampling signals, and the sampling rate of which is 2N/symbol. The sampling signal Ssa is supplied to the samplers 25a and 26a, the sampling signal Ssb to the samplers 25b and 26b.

The cross correlation signals S3a and S4a are sampled by the samplers 25a and 26a, respectively, to be turned into cross correlation signals S26a and S25a. The cross correlation signals S3b and S4b are sampled by the samplers 25b and 26b, respectively, to be turned into cross correlation signals S26b and S25b. The cross correlation signals S26a and S26b are supplied to UW phase arithmetic units 6a and 6b, and UW detectors 5a and 5b, respectively. The cross correlation signals S25a and S25b are supplied to UW phase arithmetic units 8a and 8b, respectively. The reason why the cross correlation signals supplied to the UW phase arithmetic units 6a, 6b, 8a and 8b, and the UW detectors 5a, and 5b are toggle sampled at the sampling rate of the quasi-synchronized detection signal S1 is to shorten the signal processing time by the UW phase arithmetic units and the UW detectors.

The UW phase arithmetic units 6a, 6b, 8a and 8b operate in the same manner as the UW phase arithmetic unit 6. That is, the UW phase arithmetic units 6a, 6b, 8a and 8b generate phase values θ1a, θ1b, θ2a, and θ2b of the cross correlation functions S26a, S26b, S25a and S25b, respectively. A phase synthesizer 9a is supplied with phase information S6a of the phase value θ1a and phase information S7a of the phase value θ2a to generate carrier frequency offset information S8a. A phase synthesizer 9b is supplied with phase information S6b of the phase value θ1b and phase information S7b of the phase value θ2b to generate carrier frequency offset information S8b. When power values of the cross correlation functions S26a and S26b exceed a predetermined threshold Sth3, the UW detectors 5a and 5b generate UW detection signals S5a and S5b with magnitude corresponding to the power values, respectively.

A UW selector 27 compares the magnitude of UW detection signal S5a from the UW detector 5a with the magnitude of UW detection signal S5b from the UW detector 5b, selects the UW detection signal with the larger value as an IA mode UW detection signal S5, and supplies it for reading a data signal from the data buffer 3. This is because a stronger UW detection signal provides a smaller carrier frequency offset of the quasi-synchronized detection signal S23a or S23b, and a higher accuracy in UW detection.

In addition, the IA mode detection signal S5 is also supplied to a frequency offset information selector 28. The frequency offset information selector 28 selects the carrier frequency offset information using the cross correlation function which generates the IA mode detection signal S5 as IA mode frequency offset information S8, and supplies it for setting a frequency of the NCO 11.

When the IA mode UW detection signal S5 reads the data signal stored in the data buffer 3, and IA mode frequency offset signal S8 is loaded in the NCO 11, the IA mode completes. When the IA mode completes, the DSP deactivates the frequency shifter circuit, the DDD (N) 4a and 4b, and the DDD (N/2) 7a and 7b for the quasi-synchronized detection signal S2, as well as the circuits for processing the cross correlation signals from these DDD (N) and DDD (N/D) to generate the IA mode UW detection signal S5 and the IA mode frequency offset information S8, and moves the UW differential detection system to the next FA mode described with reference to FIG. 6.

As described above, the present invention comprises IA mode UW differential detection means supplied with a quasi-synchronized detection signal and a unique word and having the number of delay symbols N (where, 0.5<N≦1) and N/2 for complex conjugate differential detection signals, respectively; and IA mode UW detector means for responding to the cross correlation signals from the IA mode UW differential detection means and generating an IA mode UW detection signal indicating detection of the unique word and IA mode frequency offset information indicating carrier frequency offset of the first quasi-synchronized detection signal, so that it has advantages of being capable of expanding a measurement range for the carrier frequency offset while maintaining detection of unique word position at a high accuracy, and maintaining a resolution for the carrier frequency at a low level.

In addition, the present invention operates FA mode UW differential detection means having the number of delay symbols M (where, 1<M) for the complex conjugate differential detection signal after completion of the IA mode, whereby it has an advantage to prevent false detection of a unique word in the IA mode.

What is claimed is:

1. A unique word differential detector comprising:
   a first differential detection delay (DDD) for cross correlating an input signal inserted with a unique word (UW) and said UW previously input by delaying each of them by a fraction N of a symbol wherein N is in the range of 0.5<N≦1;
   a second DDD for cross correlating the input signal and the UW by delaying each of the input signal and the UW by a fractional symbol delay of N/2; and
   first UW detector means for detecting a first UW detection signal and a first frequency offset of the input signal based on an output of said first and second DDD.

2. A unique word differential detector as claimed in claim 1, further comprising:
   second UW detector means for outputting a second UW detection signal using a third DDD, said third DDD cross correlating an input signal compensated for offset frequency based on the first frequency offset and the UW by delaying each of the input signal and the UW by a fraction M of a symbol, wherein M is greater than 1.

3. A unique word differential detector as claimed in claim 1, further comprising:
   first data buffer means for storing the input signal and reading the stored input signal in response to the first UW detection signal; and
   first frequency offset compensation means for compensating a frequency offset occurring in an output of said first data buffer means based on the first frequency offset.

4. A unique word differential detector as claimed in claim 1, wherein said first UW detector means comprises:
   a first UW detector circuit for comparing a power value of the output of said first DDD and a first threshold, thereby detecting the first UW detection signal.

5. A unique word differential detector as claimed in claim 1, wherein said first UW detector means comprises:
   first and second UW phase arithmetic units for generating first and second phase information from the outputs of said first and second DDD, respectively; and
   a phase synthesizer for synthesizing outputs of said first and second UW phase arithmetic units, thereby detecting the first frequency offset.

6. A unique word differential detector as claimed in claim 3, wherein said first frequency offset compensation means comprises:
   a numerical control oscillator (NCO) having an oscillation frequency varying in response to an output of a phase synthesizer; and
   a multiplier for multiplying an output of said NCO and the output of said first data buffer means.

7. A unique word differential detector according to claim 2, further comprising:
   a matched filter for preventing noise and adjacent channel interference, said matched filter being provided before said third DDD.

8. Demodulator using a unique word differential detector comprising:
   first UW detector means for detecting a first UW detection signal and a frequency offset of an input signal by using a first differential detection delay (DDD) for cross correlating the input signal inserted with a unique word (UW) and the UW previously input by delaying each of the input signal and the UW by a fraction N of a symbol, wherein N is in the range of 0.5<N≦1, and a second DDD for cross correlating the input signal and the UW by delaying each of the input signal and the UW by a fractional symbol delay of N/2;
   second UW detector means for outputting a second UW detection signal using a third DDD, said third DDD cross correlating an input signal compensated for offset frequency based on said frequency offset and the UW by delaying each of the frequency compensated input signal and the UW by a symbol delay of M, wherein M is greater 1; and
   demodulator means for demodulating the input signal through synchronized detection after the second UW detection signal is detected by said second UW detector means.

9. A method of detection using a unique word differential detector, said method comprising the steps of:
   when the detector is in an initial acquisition mode (IA mode),
   cross correlating an input signal inserted with a unique word (UW) and the UW previously input by delaying each of the input signal and the UW by a fraction N of a symbol by a first differential detection delay (DDD), wherein N is in the range of 0.5<N≦1;
   cross correlating the input signal and the UW by delaying each of the input signal and the UW by a fractional symbol delay of N/2 by using a second DDD;
   detecting a first UW detection signal and a frequency offset of the input signal based on outputs of the first and second DDD; and
   when the detector is in a fine tune acquisition mode (FA mode),
   outputting a second UW detection signal using a third DDD, the third DDD cross correlating an input signal compensated for offset frequency based on said frequency offset and the UW by delaying each of the frequency compensated input signal and the UW by a symbol delay of M, wherein M is greater than 1.

10. A method of demodulation using a demodulator having a unique word differential detector, said method comprising the steps of:
   when the detector is in an initial acquisition mode (IA mode),
   cross correlating an input signal inserted with a unique word (UW) and the UW previously input by delaying each of the input signal and the UW by a by a fraction of a symbol by a first differential detection delay (DDD), wherein N is in the range of 0.5<N≦1;
   cross correlating the input signal and the UW by delaying each of the input signal and the UW by a fractional symbol delay of N/2 by using a second DDD;
   detecting a first UW detection signal and a frequency offset of the input signal based on outputs of the first and second DDD;
   when the detector is in a fine tune acquisition mode (FA mode),
   outputting a second UW detection signal using a third DDD, the third DDD cross correlating an input signal compensated for offset frequency based on said first frequency offset and the UW by delaying each of the frequency compensated input signal and the UW by a symbol delay of M, wherein M is greater than 1; and moving to a steady state mode (SS mode) after outputting the second UW detection signal in said outputting step, wherein the input signal is demodulated through synchronized detection.

11. A unique word differential detector comprising:

first frequency shifter means for shifting an input signal inserted with a unique word (UW) by a first frequency;

a first differential detection delay (DDD) for cross correlating an input signal shifted by the first frequency and the UW previously input by delaying each of the first shifted input signal and the UW by a fraction N of a symbol, wherein N is in the range of $0.5 < N \leq 1$;

a second DDD for cross correlating an input signal shifted by said first frequency and the UW by delaying each of the first shifted input signal and the UW by a fractional symbol delay of N/2;

first UW detector means for detecting a first UW detection signal, and first and second phase information based on the outputs of said first and second DDD;

second frequency shifter means for shifting the input signal by a second frequency to define a second shifted input signal;

a third DDD for cross correlating the second shifted input signal with the UW by delaying each of the second shifted input signal and the UW by a fraction N of a symbol, wherein N is in the range of $0.5 < N \leq 1$);

a fourth DDD for cross correlating the second shifted input signal with the UW by delaying each of the second shifted input signal and the UW by a fractional symbol delay of N/2;

second UW detector means for detecting a second UW detection signal, and third and fourth phase information based on outputs of said third and fourth DDD;

first selector means for selecting a larger one of the first and second UW detection signals;

second selector means for selecting one of a first phase synthesized value synthesizing said first and second phase information and a second phase synthesized value synthesizing said third and fourth phase information in the same side as selected by said first selector means; and third UW detector means for detecting a third UW detection signal based on an output of said first selector means, and detecting a frequency offset of the input signal based on an output of said second selector means.

12. A unique word differential detector as claimed in claim 11, further comprising:

a fifth DDD for cross correlating an input signal compensated for offset frequency based on said frequency offset and the UW by delaying each of the frequency compensated input signal and the UW by a symbol delay of M, wherein M is greater than 1; and UW selector means for outputting a third UW detection signal by using said fifth DDD.

13. Demodulator using a unique word differential detector comprising:

first frequency shifter means for shifting an input signal inserted with a unique word (UW) by a first frequency;

a first differential detection delay (DDD) for cross correlating an input signal shifted by the first frequency and the UW previously input by delaying each of the first shifted input signal and the UW by a fraction N of a symbol, wherein N is in the range of $0.5 < N \leq 1$;

a second DDD for cross correlating an input signal shifted by said first frequency and the UW by delaying each of the first shifted input signal and the UW by a fractional symbol delay of N/2;

first UW detector means for detecting a first UW detection signal, and first and second phase information based on outputs of said first and second DDD;

second frequency shifter means for shifting the input signal by a second frequency;

a third DDD for cross correlating an input signal shifted by said second frequency and the UW previously input by delaying each of the second shifted input signal and the UW by a fraction N of a symbol delay, wherein N is in the range of $0.5 < N \leq 1$;

a fourth DDD for cross correlating an input signal shifted by the second frequency and the UW by delaying each of the second shifted input signal and the UW by a fractional symbol delay of N/2;

second UW detector means for detecting a second UW detection signal, and third and fourth phase information based on outputs of said third and fourth DDD;

first selector means for selecting a larger one of the first and second UW detection signals;

second selector means for selecting one of a first phase synthesized value synthesizing said first and second phase information and a second phase synthesized value synthesizing said third and fourth phase information, wherein said second selector means selects a phase synthesized value corresponding to a UW detection signal selected by said first selector means;

third UW detector means for detecting a third UW detection signal based on an output of said first selector means, and detecting a frequency offset of the input signal based on said second selector means;

a third DDD for cross correlating a frequency compensated input signal with the UW by delaying each of the frequency compensated input signal and the UW by a symbol delay of M, wherein M is greater than 1, and wherein the frequency compensated input signal is compensated based on a frequency offset;

third UW selector means for outputting a third UW detection signal by using said third DDD; and demodulator means for demodulating the input signal through synchronized detection after the third UW detection signal is detected by said third UW detector means.

14. A method of detection using a unique word differential detector, said method comprising the steps of:

when the detector is in an initial acquisition mode (IA mode), shifting an input signal inserted with a unique word (UW) by a first frequency;

cross correlating an input signal shifted by said first frequency and said UW previously input by delaying each of the first shifted input signal and the UW by a fraction N of symbol by a first differential detection delay (DDD), wherein N is in the range of $0.5 < N \leq 1$;

cross correlating an input signal shifted by said first frequency and said UW by delaying each of the first shifted input signal and the UW by a symbol of N/2 by using a second DDD;

detecting a first UW detection signal, and first and second phase information based on the outputs of said first and second DDD;

shifting the input signal by a second frequency to define a second shifted input signal;

cross correlating the second shifted input signal with the UW by delaying each of the second shifted input signal and the UW by the symbol delay of N by using a third DDD;

cross correlating the second shifted input signal and the UW by delaying each of the second shifted input signal and the UW by a fractional symbol delay of N/2 by using a fourth DDD;

detecting a second UW detection signal, and third and fourth phase information based on the outputs of third and fourth DDD;

selecting a larger one of the first and second UW detection signals;

selecting one of a first phase synthesized value synthesizing said first and second phase information and a second phase synthesized value synthesizing said third and fourth phase information in the same side as selected by said first selector means by second selector means;

detecting a third UW detection signal based on the output of said first selector means, and detecting a frequency offset of the input signal based on said second selector means; and when the detector is in a fine tune acquisition mode (FA mode), outputting a third UW detection signal by using the fifth DDD for cross correlating an input signal compensated for offset frequency based on said first frequency offset and said UW by delaying each of the frequency compensated input signal and the UW by a symbol delay of M, wherein M is greater than 1.

15. A method of demodulation using a demodulator having a unique word differential detector, said method comprising the steps of:

when the detector is in an initial acquisition mode (IA mode), shifting an input signal inserted with a unique word (UW) by a first frequency;

cross correlating an input signal shifted by said first frequency and said UW previously input by delaying each of the first shifted input signal and the UW by a fraction N of a symbol by using a first differential detection delay (DDD), wherein N is in the range of 0.5<N≦1;

cross correlating an input signal shifted by said first frequency and said UW by delaying each of the first shifted input signal and the UW by a fractional symbol delay of N/2 by using a second DDD;

detecting a first UW detection signal, and first and second phase information based on the outputs of said first and second DDD;

shifting the input signal by a second frequency;

cross correlating an input signal shifted by said second frequency and said UW previously input by delaying each of the second shifted input signal and the UW by the fraction N of a symbol by using a third DDD;

cross correlating an input signal shifted by said second frequency and said UW by delaying each of the second shifted input signal and the UW by a fractional symbol delay of N/2 by using a fourth DDD;

detecting a second UW detection signal, and third and fourth phase information based on the outputs of third and fourth DDD;

selecting a larger one of the first and second UW detection signals;

selecting one of a first phase synthesized value synthesizing said first and second phase information and a second phase synthesized value synthesizing said third and fourth phase information, wherein a phase synthesized value corresponding to a selected UW detection signal is selected;

detecting a third UW detection signal based on the selection of the larger one of the first and second UW detection signals, and detecting a frequency offset of the input signal based on the phase synthesized value selected;

when the detector is in a fine tune acquisition mode (FA mode), outputting a third UW detection signal by using a fifth DDD for cross correlating a frequency compensated input signal with the UW by delaying each of the frequency compensated input signal and the UW by a symbol delay of M, wherein M>1, and wherein the frequency compensated input signal is compensated based on a frequency offset; and moving to a steady state mode (SS mode) after said outputting step, wherein the input signal is demodulated through synchronized detection.

* * * * *